United States Patent Office 3,519,454
Patented July 7, 1970

3,519,454
KAOLIN SLURRIES CONTAINING PEROXY-
HYDRATES AS GERMICIDES
Edgar W. Sawyer, Jr., Metuchen, and Charles G. Albert, Basking Ridge, N.J., and John G. Miller, Philadelphia, Pa., assignors, by mesne assignments, to Engelhard Minerals & Chemicals Corporation, Edison, N.J., a corporation of Delaware
No Drawing. Filed Sept. 27, 1967, Ser. No. 671,104
Int. Cl. C08h 17/06, 17/64
U.S. Cl. 106—288    10 Claims

ABSTRACT OF THE DISCLOSURE

Kaolin slurries adapted for use in preparing clay-coated paper are treated with peroxyhydrate compounds in order to control the population of micro-organisms by mycocidal and mycostatic action.

BACKGROUND OF THE INVENTION

Kaolin clays adapted for use by the paper industry as coating pigments are frequently supplied in the form of aqueous slurries, usually concentrated aqueous slurries. These slurries (suspensions) support the growth of both bacteria and fungus. The micro-organisms are very undesirable when present in the slurries and they also pose problems when the slurries are subsequently mixed with adhesives to prepare paper coating compositions. Slurries made from flotation beneficiated clays are particularly difficult to protect against the action of micro-organisms. In this type of slurry, gross contamination is evidenced by the presence of an undesirable odor and, when the slurries are very concentrated, by the undesirable gelling of the slurries.

Several types of germicides, such as thiadiazine thiones, chlorophenols and phenylphenols have been added to kaolin slurries in small amounts in order to protect the slurries against bacterial attack and, in some cases, to control fungus. These germicides leave a residue on a clay-coated material which may be objectionable when the coated product is employed for certain uses. Some germicides which effectively control the population of micro-organisms undesirably increase the viscosity of high solids clay-water suspensions. This increase in viscosity may render the slurries unsuitable for uses, such as paper coating, in which fluid high solids clay-water systems are required. Other germicides control bacteria but not fungi. In fact, some additives promote the growth of bacteria and fungi. Thus, agents for controlling micro-organisms in kaolin slurries must satisfy a variety of requirements not encountered in other uses of germicides.

THE INVENTION

An object of this invention is to treat kaolin slurries with an additive which controls the micro-organisms in the slurry by both mycocidal and mycostatic action and, unlike additives previously used for this purpose, is fugitive under conditions of use by the paper industry and leaves no objectionable residue.

Another object is to provide a means for controlling micro-organisms in kaolin slurries without affecting the viscosity of the slurries.

In accordance with this invention, a small amount of a peroxyhydrate compound is incorporated into a kaolin slurry to control the population of micro-organisms (bacteria and fungi) by mycocidal and mycostatic action. The peroxyhydrates, which are hydrogen peroxide addition compounds, are useful in controlling micro-organisms in slurries made with kaolins which have undergone many different types of processing, e.g., air-classification, hydraulic-classification, bleaching, spray drying. The peroxyhydrates are especially useful in the treatment of slurries prepared with clays which have been previously beneficiated by froth flotation.

It was surprising and unexpected that peroxyhydrates were so effective in controlling micro-organisms in kaolin slurries since peroxyhydrates are generally considered to be very mild germicides. Ozone, normally a much more powerful oxidizing agent and germicide than peroxyhydrates, was inefficient for the intended purpose. Hydrogen peroxide and sodium peroxide were also ineffective.

The preferred peroxyhydrates are addition products of hydrogen peroxide with salts of a strong base and a weak acid. These include: $NaBO_2.H_2O_2$,
$$NaBO_2.H_2O_2 : 3H_2O$$
$Na_4P_2O_7.nH_2O_2$ (wherein $n$ is a variable ranging from ½ to 3), $Na_2CO_3.H_2O_2.H_2O$, $2\ Na_2CO_3.3H_2O.H_2O$ and $Na_2CO_3.3H_2O_2$.

The germicide can be added as a preformed peroxyhydrate or the components of the peroxyhydrate can be separately incorporated and the peroxyhydrate formed in situ in presence of the ingredients of the kaolin-water slurry.

Also useful are hydrogen peroxide addition products of ammonium sulfate, borax, sodium silicate, and silicate peroxyhydrates such as the product known as sodium "perborosilicate" which are described in U.S. Pat No. 2,367,971 to Spiegler. When the compounds required to form the peroxyhydrate are added separately, it is not necessary to employ quantities which are stoichiometric for the formation of the peroxyhydrate.

Mixtures of peroxyhydrate salts may be employed.

The amount of peroxyhydrate required to obtain the desired control of the population of micro-organisms in the slurry varies somewhat with the species of peroxyhydrate, the micro-organism population of the slurry and the extent of the control that is desired. Generally, the peroxyhydrate is added in amount within the range of about 0.05% to 0.5% of the weight of the clay in the slurry. In most instances the peroxyhydrate is incorporated in amount of from about 0.05% to 0.15% of the weight of the clay.

When insufficient peroxyhydrate is present, the benefits may not be so appreciable as when larger quantities are present. Use of excessive peroxyhydrate is undesirable for economic reasons and because of the possibility that the excess peroxyhydrate will interfere with the dispersant requirement of the slurry.

The peroxyhydrates are useful with clay-water suspensions containing only kaolin clay and water. They are also useful with clay-water suspensions which contain any of the usual clay deflocculating (dispersing) agents such as sodium condensed phosphates, exemplified by tetrasodium pyrophosphate, sodium hexametaphosphate and sodium tetraphosphate, sodium carbonate, sodium silicate, and sodium lignosulfonates. In fact, some of the compounds which form peroxyhydrates by addition with hydrogen peroxide are clay dispersants. However, when forming a peroxyhydrate in situ by adding hydrogen peroxide to a slip containing such a dispersant, additional dispersant may, in some cases, be used in order to maintain the suspension in required dispersed state or condition after addition of hydrogen peroxide and reaction of the peroxide with a portion of the dispersant.

The peroxyhydrates are of special benefit when used with high-solids, fluid, deflocculated clay-water suspensions, i.e., suspensions containing 65% or more (usually 68% to 72%) clay solids. These high-solids slurries are usually deflocculated with from about 0.1 to 0.5%, based on the dry clay weight, of sodium condensed phosphate salts since highly concentrated clay-water suspensions require the use of extremely powerful deflocculating agents such as the sodium condensed phosphate salts in order to maintain the systems in a fluid condition. Microbial action tends to accelerate chemical changes in sodium condensed phosphate salts, resulting in the formation of compounds which are ineffective or only moderately effective as deflocculating agents. When this occurs in a highly concentrated clay-water suspension, the suspension loses the fluidity required for pumping and mixing. By incorporating a peroxyhydrate into a high-solids clay-water suspension which is deflocculated with tetrasodium pyrophosphate, sodium hexametaphosphate or other sodium condensed phosphate dispersant, undesirable gelation or thickening may be avoided.

The peroxyhydrates do not exhibit their mycocidal properties immediately and slurries treated with peroxyhydrates should be aged to assure that the bacterial and fungi counts are reduced to a desired level. An aging period of a day is recommended. Since the additives also have mycostatic properties, the slurries are protected against subsequent contamination.

As mentioned, the protected slurries of the invention are especially useful as ingredients in preparing clay pigmented coating compositions for paper. In preparing these compositions, usually referred to as "kaolin coating colors," the slurries are mixed with adhesives such as, for example, starch or casein or latex, and the mixture applied to paper. Since the paper coating operations normally involve a heating step, the peroxyhydrate will be decomposed and inactivated. An innocuous residue remains.

While slurries of the present invention contain as essential constituents kaolin clay, water, peroxyhydrate compound and, usually deflocculating agent, other ingredients may also be present, as examples of which may be mentioned: sequestering agents, chemicals to adjust pH such as caustic soda or ammonia; and pigments such as calcium carbonate.

EXAMPLES

In the examples which follow, bacteria and fungi counts were made by conventional analytical techniques and are reported as number per milliliter of slurry.

The slurry used in the tests was a 70% dispersed slurry of flotation beneficiated kaolin clay. The procedure and the reagents used in the floatation beneficiation of the clay is described in an article by Ernest W. Greene and James B. Duke, "Selective Froth Flotation of Ultrafine Minerals or Slimes," Mining Engineering, October 1962, 51–55. The flotation reagents included calcite, tall oil fatty acids, and calcium petroleum sulfonate. The floated, bleached clay was formed into a 70% solids fluid slurry by dispersing the clay in water containing tetrasodium pyrophosphate as a deflocculating (dispersing) agent in amount of 0.30% of the clay weight. The slip also contained sodium hydroxide added in amount to adjust the pH to 7.2. The 70% solds slurry of the flotation beneficiated kaolin clay was aged for one week at ambient temperature in a sealed nonsterile container in order to develop a microorganism population.

EXAMPLE I (A) The following tests were carried out to demonstrate the mycocidal properties of peroxyhydrate compounds on the high-solids slurry of flotation beneficiated kaolin clay.

A control test was carried out with one portion of the slurry which contained tetrasodium pyrophosphate (TSPP) in amount of 0.30% by weight of the clay in the slurry. In accordance with this invention, another portion of the aged 70% solids slurry containing 0.30% TSPP was treated by adding a sufficient quantity of a 30% aqueous solution of hydrogen peroxide to provide $H_2O_2$ in amount of 0.033% based on the weight of the clay.

After addition of the hydrogen peroxide and the in situ formation of the peroxyhydrate, the slurry was thoroughly agitated.

Also in accordance with this invention, a third portion of the kaolin slurry containing 0.30% TSPP was treated by incorporating $NaBO_2 \cdot H_2O_2 \cdot 3H_2O$ in amount of 0.10% of the weight of the slurry (0.14% of the dry weight of the clay). Bacteria and fungi counts were made on each of the slurries five days after the additives had been incorporated.

The results are summarized in Table I.

TABLE I.—BACTERICIDAL AND FUNGICIDAL ACTION OF PEROXYHYDRATE COMPOUNDS ON KAOLIN SLURRIES

| Material added | Bacteria count | Fungi count |
|---|---|---|
| (1) 0.30% TSPP | $10 \times 10^6$ | $1 \times 10^6$ |
| (2) 0.30% TSPP and 0.10% of 30% $H_2O_2$ | <10 | <10 |
| (3) 0.30% TSPP and 0.14% $NaBO_2.H_2O_2.3H_2O$ | <10 | <10 |

The results in Table I show that the presence of tetrasodium pyrophosphate peroxyhydrate and sodium borate peroxyhydrate reduced the bacterial population to more than one-millionth of the population of the control slurry in which no peroxyhydrate was present. The peroxyhydrate also reduced fungus population by a factor of more than $1 \times 10^5$. These results demonstrate the outstanding bacterial and fungicidal action of several peroxyhydrates in kaolin slurries.

(B) The tests above-described demonstrate the mycocidal action of peroxyhydrate compounds on slurries of flotation kaolin clay. The following tests were carried out to demonstrate the mycostatic properties of a peroxyhydrate compound on the clay slurry. The slurry used in this test was the slurry, described in part (A) of this example, to which 0.30% TSPP and 0.10% of 30% $H_2O_2$ had been added.

Bacterial and fungi counts were made on the slurry containing tetrasodium pyrophosphate-hydrogen peroxide addition compound after the slurry had aged for five days in a closed sterilized container. Ninety-nine ml. of the aged slurry containing the peroxyhydrate compound was mixed with 1 ml. of the contaminated slurry, also described in part A to which only TSPP had been added. Since the former slurry had a theoretical bacteria count of $1 \times 10^6$ and a fungi count of $1 \times 10^5$ and the latter slurry had bacteria and fungi counts of 10, the resulting contaminated slurry had a theoretical bacteria count of $1 \times 10^5$ and a fungi count of $1 \times 10^4$. The contaminated slurry was aged for 24 hours in a sealed nonsterile jar at ambient temperature and bacteria and fungi counts were made. The contaminated slurry was then retested after it had aged an additional 36 hours. The results are summarized in Table II.

TABLE II.—BACTERIOSTATIC AND FUNGISTATIC ACTION OF PEROXYHYDRATE COMPOUND ON KAOLIN SLURRY

| | | Counts/ml. | |
|---|---|---|---|
| Contaminant | Aged | Bacteria count | Fungi count |
| None | 5 days | 10 | 10 |
| Contaminated slurry added | 5 days + 24 hrs | 300 | 80 |
| Do | 5 days + 36 hrs | 360 | 100 |

Data in Table II demonstrate that the peroxyhydrate additive protected the slurry against further growth of both bacteria and fungus, thus demonstrating the mycostatic action of the additive.

(C) In order to determine the effect of peroxyhydrate additives on the viscosity of the kaolin slurry, the viscosity of the control slurry was compared with that of the slurries containing peroxyhydrate additives. Viscosity measurements at high rates of shear were made with the Hercules viscometer. Low shear rate viscosity measurements were made with the Brookfield instrument. It was found that the low and high shear rate viscosities were substantially unchanged as a result of the presence of the peroxyhydrates, demonstrating that the additive did not impair the rheological properties of the clay slurries.

EXAMPLE II

In order to point out some of the unique advantages of using peroxyhydrates to control micro-organisms in kaolin slurries, tests similar to those carried out in Example I were performed with various "per" compounds on other portions of the 70% solids dispersed slurry of the flotation beneficiated clay. In all cases counts were made of slurries after being aged one week in sealed containers.

Using ammonium persulfate in amounts of 0.050% to 0.10% of the weight of the clay, the total count was reduced greatly. However, the fungi count was drastically increased.

Sodium peroxide in amounts of 0.025% and 0.050% of the weight of the clay increased the bacteria count over that of the control.

Ozone, added as a gas in amounts within the range of 56 to 186 p.p.m., had substantially no effect on bacteria or fungi counts.

The results show that oxidizing agents as a class are not satisfactory as agents to control micro-organisms in kaolin slurries.

We claim:

1. A kaolin-water suspension containing a small amount of a water-soluble peroxyhydrate compound in amount sufficient to control the population of bacteria and fungi therein, said peroxyhydrate compound being an addition product of hydrogen peroxide and a sodium salt of the group consisting of borate, phosphate and carbonate.

2. The suspension of claim 1 wherein said water-soluble peroxyhydrate is a hydrogen peroxide addition compound of $NaBO_2$.

3. The suspension of claim 1 wherein said water-soluble peroxyhydrate is a peroxide addition compound of $Na_4P_2O_7$.

4. The suspension of claim 1 wherein said water-soluble peroxyhydrate is a peroxide addition compound of $Na_2CO_3$.

5. The suspension of claim 1 wherein said peroxyhydrate is present in amount within the range of 0.05% to 0.5% of the weight of said clay.

6. The suspension of claim 1 wherein said peroxyhydrate is present in amount within the range of 0.05% to 0.15% of the weight of said clay.

7. The suspension of claim 1 wherein said suspension contains clay which has been beneficiated by flotation in the presence of organic flotation reagents.

8. The suspension of claim 6 which contains at least 65% by weight clay and tetrasodium pyrophosphate in dispersant-effective quantity.

9. A method for controlling micro-organisms in a kaolin clay-water suspension which comprises incorporating into said suspension a small amount of a peroxyhydrate compound, said peroxyhydrate compound being an addition product of hydrogen peroxide and a sodium salt of the group consisting of borate, phosphate and carbonate.

10. The method of claim 9 wherein said clay-water suspension contains at least 65% by weight clay and tetrasodium pyrophosphate in dispersant-effective quantity and said peroxyhydrate compound is an addition product of $Na_4P_2O_7$ and $H_2O_2$ formed in situ by adding hydrogen peroxide to said suspension containing said tetrasodium pyrophosphate dispersant.

References Cited
UNITED STATES PATENTS

| | | | |
|---|---|---|---|
| 3,236,666 | 2/1966 | Sawyer | 106—72 |
| 3,266,917 | 8/1966 | Sawyer et al. | 106—72 |
| 3,282,715 | 11/1966 | Sawyer et al. | 106—72 |

JAMES E. POER, Primary Examiner

U.S. C.L. X.R.

106—72